(12) United States Patent
Davydov et al.

(10) Patent No.: US 11,025,310 B2
(45) Date of Patent: Jun. 1, 2021

(54) CODEBOOK DESIGN FOR NEW RADIO (NR) SYSTEMS

(71) Applicant: APPLE INC., Cupertino, CA (US)

(72) Inventors: Alexei Davydov, Nizhny Novgorod (RU); Gregory V. Morozov, Nizhny Novgorod (RU); Victor Sergeev, Nizhny Novgorod (RU); Wook Bong Lee, Pleasanton, CA (US)

(73) Assignee: APPLE INC., Cupertino, CA (US)

( * ) Notice: Subject to any disclaimer, the term of this patent is extended or adjusted under 35 U.S.C. 154(b) by 1 day.

(21) Appl. No.: 16/476,537

(22) PCT Filed: Dec. 27, 2017

(86) PCT No.: PCT/US2017/068591
§ 371 (c)(1),
(2) Date: Jul. 8, 2019

(87) PCT Pub. No.: WO2018/128895
PCT Pub. Date: Jul. 12, 2018

(65) Prior Publication Data
US 2019/0326959 A1 Oct. 24, 2019

Related U.S. Application Data

(60) Provisional application No. 62/444,242, filed on Jan. 9, 2017.

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0469* (2013.01); *H04B 7/0626* (2013.01); *H04L 5/0051* (2013.01); *H04W 88/02* (2013.01)

(58) Field of Classification Search
CPC ............... H04L 5/0051; H04L 25/0204; H04L 25/0248; H04B 7/0417; H04B 7/0469;
(Continued)

(56) References Cited

U.S. PATENT DOCUMENTS

| 8,619,542 | B2 * | 12/2013 | Mondal | ............... H04L 25/0391 370/208 |
| 2010/0188966 | A1 * | 7/2010 | Pun | ...................... H04B 7/0417 370/203 |

(Continued)

FOREIGN PATENT DOCUMENTS

EP 1941631 B1 3/2012

OTHER PUBLICATIONS

"HARQ-ACK codebook adaptation for Rel-13 eCA"; 3GPP TSG RAN WG1 Meeting #82bis R1-156729 Anaheim, USA, Nov. 15-22, 2015; Lenovo (Year: 2015).*

(Continued)

Primary Examiner — Benjamin H Elliott, IV

(57) ABSTRACT

Technology for a user equipment (UE) operable to assist a Next Generation NodeB (gNB) for beamforming is disclosed. The UE can determine a covariance matrix for a channel between the UE and the gNB. The UE can quantize the covariance matrix to obtain a quantized covariance matrix. The quantized covariance matrix can include M best diagonal entries that are selected from the covariance matrix, wherein M is an integer. The UE can encode the quantized covariance matrix as feedback for transmission to the gNB.

18 Claims, 8 Drawing Sheets

(51) Int. Cl.
    *H04B 7/06* (2006.01)
    *H04L 5/00* (2006.01)
    *H04W 88/02* (2009.01)

(58) Field of Classification Search
    CPC .. H04B 7/0626; H04B 7/0617; H04B 7/0634;
    H04B 7/0639; H04B 7/065; H04B
    7/0663; H04B 7/063; H04W 88/02
    See application file for complete search history.

(56) References Cited

U.S. PATENT DOCUMENTS

| | | | | |
|---|---|---|---|---|
| 2011/0176439 A1* | 7/2011 | Mondal | ............... | H04L 25/0391 370/252 |
| 2013/0016764 A1* | 1/2013 | Kim | ................. | H04L 25/03343 375/219 |
| 2014/0105317 A1* | 4/2014 | Erell | .................... | H04B 7/0417 375/267 |
| 2015/0030092 A1* | 1/2015 | Krishnamurthy | .... | H04B 7/0626 375/267 |
| 2016/0294456 A1* | 10/2016 | Kerhuel | .............. | H04L 27/2613 |
| 2016/0359538 A1* | 12/2016 | Onggosanusi | ........ | H04L 5/0057 |
| 2016/0380363 A1* | 12/2016 | Logothetis | ..................... | 343/853 |
| 2017/0302353 A1* | 10/2017 | Rahman | ............... | H04B 7/0486 |
| 2018/0145737 A1* | 5/2018 | Rahman | ............... | H04B 7/0634 |
| 2019/0260429 A1* | 8/2019 | Xu | ....................... | H04B 17/309 |
| 2019/0326959 A1* | 10/2019 | Davydov | .............. | H04L 5/0051 |
| 2020/0083937 A1* | 3/2020 | Rahman | ............... | H04B 7/0486 |

OTHER PUBLICATIONS

"Remaining Details of Codebook Subset Restriction"; 3GPP TSG-RAN WG1#83 R1-157203 Anaheim, USA, Nov. 15-22, 2015; Ericsson (Year: 2015).*

"Discussion on Class A codebook for eFD-MIMO"; 3GPP TSG RAN WG1 Meeting #86bis R1-1609195 Lisbon, Portugal, Oct. 10-14, 2016; LG Electronics (Year: 2016).*

"Codebook Design Requirement for NR"; 3GPP TSG RAN WG1 Meeting #86bis R1-1610068 Lisbon, Portugal Oct. 10-14, 2016; NTT DOCOMO (Year: 2016).*

* cited by examiner

CODEBOOK DESIGN FOR NEW RADIO (NR) SYSTEMS

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
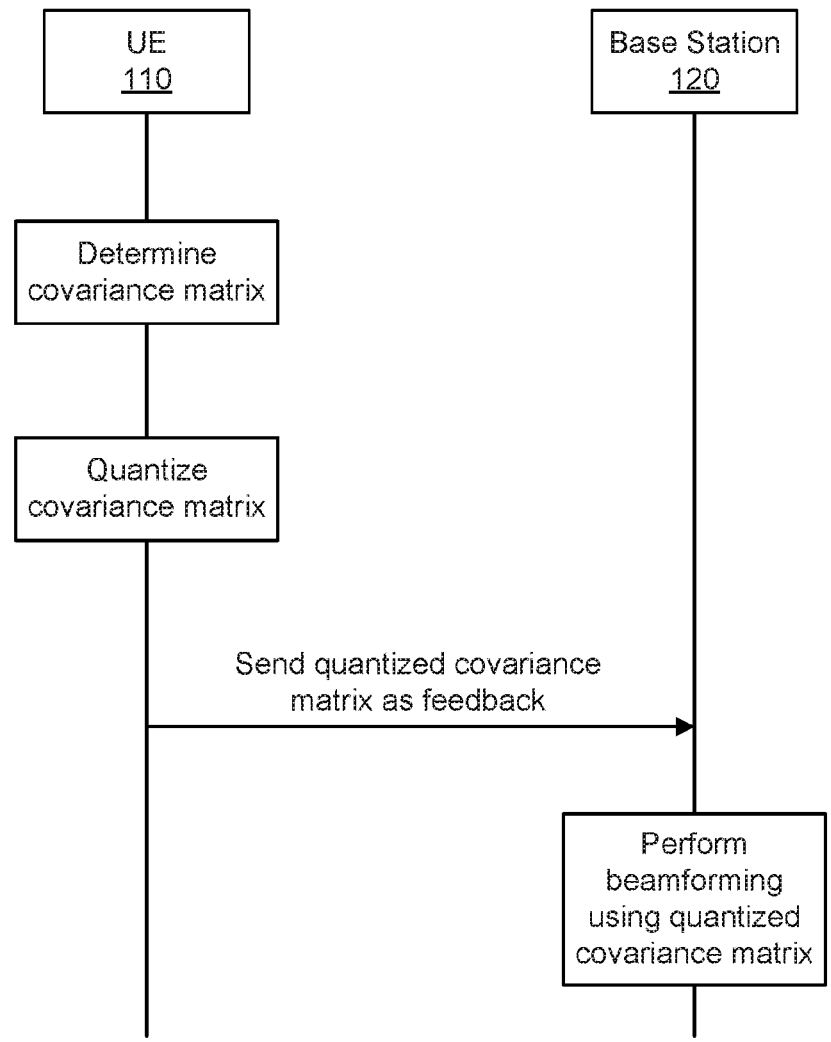
FIG. 1 illustrates a technique for determining a covariance matrix at a user equipment (UE) and reporting a quantized version of the covariance matrix to a base station to assist the base station for beamforming in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be refer to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Increased use of mobile devices, such as smartphones and tablets, with an expanding number of wireless services offered on the devices, such as streaming video, have placed increased data loads and throughput demands on wireless networks. To handle the increasing amount of wireless services to an increasing numbers of users, various multiple antenna techniques can be employed in wireless network environments to meet the increasing data and throughput demands.

Multiple-input-multiple-output MIMO technology is the use of multiple antennas at both one or more transmitters (Tx) and one or more receivers (Rx) in a wireless communication system. A MIMO system can be used to increase data throughput and link reliability of a network without increasing bandwidth frequencies or increasing transmit power of the network. To achieve the increased data throughput and link reliability, the data communicated between a base station and a UE can be spread over the multiple antennas to achieve an array gain that improves the spectral efficiency and achieve a diversity gain that increases the link reliability. Massive MIMOs can deploy a large number of elements in antenna arrays. Multiple terminals can be deployed for combining a massive MIMO technology with conventional time and frequency division multiplexing using orthogonal frequency division multiplexing (OFDM).

Three-dimensional (3D) MIMO systems can be used in MIMO networks to enhance the cellular performance by deploying antenna elements in both horizontal and vertical dimensions, e.g. a two dimensional (2D) antenna array. A 3D MIMO system can direct communications in two dimensions, i.e. horizontally and vertically, to a location in a three dimensional (3D) space. The direction of communications in 3D space can increase the directionality, allowing for increased numbers of communication paths, more focused beamforming, and increased throughput for spatial multiplexing.

In a wireless communications network, throughput can be affected by both the signal strength and interference strength. The throughput of a network can be increased by balancing a ratio between a signal strength and an interference level of nodes in a network. One technique for balancing signal strength and interference strength for nodes in a network can be to use beamforming. Beamforming can be used for an antenna array to direct or control signal transmission directions. In 3D MIMO systems, beamforming can be performed in a horizontal domain and a vertical domain.

In the downlink, the transmitter can improve the performance by using channel state information (CSI) regarding the downlink channel by obtaining information from the receiver. The CSI can be obtained by the transmitter from the receiver from estimation of the uplink channel and by using channel reciprocity of the wireless channel and/or from quantized feedback measured by the receiver.

The quantized CSI can include a precoding matrix index (PMI) to assist beamforming or precoding selection at the transmitter antennas of a base station. A set of possible PMI's can be denoted as a codebook. In other words, the transmitter antennas use a predefined set of precoding matrices (a "codebook"), and the channel feedback comprises preferred Precoding Matrix Indicators (PMI) that point to precoding matrices selected from the codebook.

In one configuration, in an LTE Release 14 wireless communication system, an antenna port layout can include 32 antenna ports. In addition, the LTE wireless communication system can support implicit feedback from a UE, which can be CSI feedback to maximize throughput. The UE can determine a best rank and codebook that provides a maximum throughput based on a channel between the UE and a Tx/Rx point (TRP) (or base station), which can be estimated at the UE from non-zero CSI reference signals (CSI-RS) from the base station, as well as from an interference estimated at the UE by, e.g., an interference measurement resource (IMR).

In LTE Release 13 systems, in order to maximize channel gain, a Class A codebook has been adopted. The Class A codebook can have a dual stage codebook structure. The codebook can include a precoder that is constructed by the product of two precoding matrices (W1 and W2). W1 can be a matrix that is reported by the UE for an entire wideband, and W1 can be used at the base station for selecting a group of beams. By using W2, the UE can indicate specific beamforming for specific frequency subbands, such that the base station can use this beamforming in downlink transmissions.

In other words, the Class A codebook can include two precoding matrices, W1 and W2, where W1 targets the wideband and/or long term channel properties, and W2 targets the frequency-selective and/or short term channel properties. The resulting precoder W for each subband can be the product of these two matrices.

In one example, the Class A codebook is a dual stage codebook, in which the UE can feedback the first precoding matrix (W1) in a wideband and long-term manner, and then the UE can feedback the second precoding matrix (W2) as a grid of beam and co-phase information in a subband and short-term manner.

In one example, the first precoding matrix (W1) can be a double discrete Fourier transform (DFT) connected by a Kronecker product. For example, in terms of the structure, precoding vectors in LTE are constructed from DFT precoders, which can determine a co-phase (or linear phase) between antenna elements. The precoding vectors can include a first DFT-based precoding vector ($u_m$) and a second DFT-based precoding second vector ($v_{l,m}$). The DFT-based precoding vectors can have a generic structure which can be used to support precoding for a 2D antenna array (i.e., when an antenna array has a 2D antenna structure), where the antenna elements have co-phase information in a horizontal and vertical domain to point beamforming in a specific direction. A final beam can be derived using the Kronecker product of the two DFT-based precoding vectors (e.g., $u_m$ and $v_{l,m}$).

In one example, the first DFT-based precoding vector ($u_m$) can be represented by:

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix},$$

and the second DFT-based precoding second vector ($v_{l,m}$) can be represented by:

$$v_{l,m} = \begin{bmatrix} u_m & e^{j\frac{2\pi l}{O_1 N_1}} \cdot u_m & \ldots & e^{j\frac{2\pi l(N_1-1)}{O_1 N_1}} \cdot u_m \end{bmatrix}^T.$$

In these two equations, the indexes l and m can correspond to the beam index for the first and second dimension, respectively. For example, the first dimension can be a horizontal dimension and the second dimension can be a vertical dimension, such that the indexes l and m can correspond to the horizontal and vertical dimensions, respectively. In addition, $N_1$ and $N_2$ correspond to the number of antenna elements in the first and second dimension, respectively, and $O_1$ and $O_2$ can correspond to beam oversampling. For example, the beam oversampling can be used to determine a special granularity of the beams that the Class A codebook can support. The larger the $O_1$ and/or $O_2$, the finer the granularity of beamforming that can be supported. In addition, the range of l can be from 0 to $O_1 \times N_1 - 1$, and the range of m can be from 0 to $O_2 \times N_2 - 1$.

In one configuration, in a New Radio (NR) wireless communication system, an antenna port layout can include at least 32 antenna ports and possibly 64 antenna ports. Similar to the LTE wireless communication system, the NR wireless communication system can also be designed to support beamforming.

In one example, in the NR wireless communication system, explicit feedback can be utilized in addition to implicit feedback. Explicit feedback can involve mimicking the channel or statics of the channel, such as eigenvector, covariance matrix, etc. The explicit feedback can include analog CSI feedback. The explicit feedback can include linear combination based CSI feedback (e.g., a projection of channel and/or covariance matrix and/or eigenvectors onto a basis, a linear combination of a basis, or schemes that have orthogonal basis and/or non-orthogonal basis). Quantization examples can involve magnitude and phase, real and imaginary and/or vector quantization. In addition, contents for quantized or unquantized CSI feedback can include channel covariance matrix feedback (e.g., Hermitian-form codebook, analog CSI feedback, linear combination codebook), channel approximation and/or measurement (e.g., analog CSI feedback, linear combination codebook), channel Eigen vectors (e.g., analog CSI feedback, linear combination codebook), or other forms of channel representation, which are not excluded.

In one example, one drawback of the explicit feedback is the amount of signaling overhead, which can become more problematic as the number of antenna ports increase.

As described in further detail below, technologies are described for reducing overhead of explicit feedback, and in particular, for reducing overhead of covariance matrix feedback from a UE to a base station.

In the present technology, a UE can feedback only M best ranking entries to a base station (e.g., a gNB), and the feedback of the M best ranking entries can enable the base station to perform covariance matrix reconstruction, wherein M is an integer. For example, the best M diagonal values or entries can have higher absolute values as compared to other M diagonal entries (i.e., M diagonal entries which are not the best M diagonal entries). For example, if the M diagonal values or entries are sorted from largest absolute value to lowest absolute value, then the M first entries can be considered the M "best" diagonal values or entries. The base station can reconstruct the covariance matrix to allow the base station to perform beamforming (or precoding). In other words, the reconstruction of the covariance matrix can assist beamforming selection at the base station. In one example, the UE can feedback a first precoding matrix (W1) in a Type I codebook. In a first example, the UE can determine best M ranking entries based on a non-precoded CSI-RS, and then the UE can feedback a quantized version of an M-by-M covariance matrix to the base station. In a second example, the base station can send a precoded CSI-RS using W1 feedback from the UE. Then, the UE can determine the best M ranking entries, and the UE can feedback a quantized version of an M-by-M covariance matrix to the base station. In both options, the UE can calculate the covariance matrix, and then report a quantized version of the covariance matrix to the base station. The base station can use the received quantized covariance matrix to support beamforming.

In one example, covariance matrix compression using a part of Type I feedback is novel. In addition, the covariance matrix compression can further reduce signaling overhead between the UE and base station.

In one configuration, a d-tap double directional MIMO channel model (H) can be represented by the following:

$H = \sqrt{N_t N_r} \sum_{l=1}^{L} \alpha_l \delta(\lambda - \tau_l) \alpha_r(\theta_{r,l}, \phi_{r,l}) \alpha_t^H(\theta_{t,l}, \phi_{t,l})$, where $N_t$ represents a number of transmitters, $N_r$ represents a number of receivers, L represents a number of paths, $\alpha_l$ is a channel response of an l-th path, $\delta(\lambda - \tau_l)$ is a Dirac delta function with delay $\tau_l$, $\alpha_r$ is a $N_r \times 1$ vector which represents the response of a receiver array to a plane wave with unitary power incident from a given direction, $\theta_{r,l}$ is an angle of arrival (AoA), $\phi_{r,l}$ is a zenith angle of arrival, $\alpha_t$ is $N_t \times 1$ vector which represents the response of a transmitter array to a plane wave with a power equal to a total transmit power incident from a given direction, $(\cdot)^H$ is Hermitian transpose, $\theta_{t,l}$ represents an angle of departure (AoD), and $\phi_{t,l}$ represents a zenith angle of departure (ZoD).

In one example, for a two-dimensional array, an array response a can be represented as:

$a_{m,n}(\theta, \phi) = \frac{1}{\sqrt{N}} e^{jk(md_x \sin\theta \cos\phi + nd_z \cos\phi)}$, where $\alpha_{m,n}$ represents an array response of a two-dimensional array, N represents number of antennas in the array, k is a subcarrier index, $d_x$ represents a distance between two adjacent antennas in the x axis, and $d_z$ represents a distance between two adjacent antennas in the z axis.

As shown in the equation above, a phase value in a different antenna position can increase by a same amount of value. To maximize performance in this case, a conjugate of the vector α can be multiplied to coherent combining. As a result, the LTE Release 13 Class A codebook can include DFT vectors with a phase value that increases with a same amount of value. This type of beamforming can be referred to as progressive phase shifting beamforming.

In one configuration, a covariance matrix can be calculated at the UE in a wideband manner to represent long-term statistics. For example, in an OFDM system, $H_k$ can represent a frequency channel response in a k-th subcarrier. In other words, the UE can perform a channel measurement for the subcarrier, which can be denoted by $H_k$. This can refer to a MIMO channel matrix of a number of receive antennas (e.g., at the UE) by a number of transmit antennas (e.g., at the base station). The UE can calculate the covariance matrix by averaging across the frequency and time domain of the channel matrices ($H_k$), where the covariance matrix can be determined as a linear average of the product of the channel in subcarrier k.

FIG. 1 illustrates an exemplary technique for determining a covariance matrix. The covariance matrix can be determined at a user equipment (UE) 110. The UE 110 can quantize the covariance matrix to obtain a quantized covariance matrix. The quantized covariance matrix can include M best diagonal entries that are selected from the covariance matrix, wherein M is an integer. The UE 110 can transmit the quantized covariance matrix as feedback to a base station 120. As an example, the base station 120 can be a Next Generation NodeB (gNB). The base station 120 can use the quantized covariance matrix received as feedback from the UE 110 for beamforming.

In one example, the covariance matrix (Cov) can be calculated at the UE 110 in accordance with the following:

$$\text{Cov} = \frac{1}{K} \sum_{k=1}^{K} H_k^H H_k,$$

where K represents a number of subcarriers, and Cov is a Hermitian matrix.

In one example, a frequency domain expression of $H_k$ can be represented by:
$H_k = \sqrt{N_t N_r} \sum_{l=1}^{L} \alpha_l \alpha_r(\theta_l) \alpha_t^H(\phi_l) e^{-j2\pi k \tau_l / N}$, and thus, Cov can be equal to:

$$\frac{\sqrt{N_t N_r}}{K} \sum_{k=1}^{K} \sum_{l1=1}^{L} \sum_{l2=1}^{L} \alpha_{l1}^* \alpha_{l2} e^{\frac{j2\pi k \tau_{l1}}{N}} e^{-\frac{j2\pi k \tau_{l2}}{N}} \times$$

$$a_t(\theta_{t,l1}, \phi_{t,l1}) a_r^H(\theta_{r,l1}, \phi_{r,l1}) \times a_r(\theta_{r,l2}, \phi_{r,l2}) a_t^H(\theta_{t,l2}, \phi_{t,l2})$$

In one configuration, the UE 110 can create an orthogonal basis from $N_t$, which can correspond to a number of transmit antennas from $N_t$ DFT vectors. The UE 110 can define a matrix U as a base matrix which consists of an $N_t$ orthogonal basis. The UE 110 can create the matrix U from multiple instances of vector α, which can each depend on two parameters (e.g., θ and φ), and each vector α can correspond to a DFT type of vector in the Class A codebook. For example, there can be 80 vectors that are used in total to create the matrix U. The matrix U can correspond to the orthogonal basis that the UE 110 is to create. The matrix U can have orthogonal vectors, such that all of the vectors α are orthogonal to each other.

For example, the UE 110 can define the matrix U to consist of the $N_t$ orthogonal basis in accordance with the following:

$$U=[\alpha(\theta_1,\phi_1)\alpha(\theta_2,\phi_2) \ldots \alpha(\theta_{Nt},\phi_{Nt})],$$

where $(\theta_i, \phi_i)$ can be determined to make $U^H U=I$. In other words, the product of the matrix $U^H$ (or U Hermitian conjugated by the matrix U is equal to the identity matrix.

In one example, after the matrix U is created at the UE 110, the UE 110 can select a best $\alpha(\theta_1, \phi_1)$ from a NR Type I or LTE Class A codebook.

In one example, the UE 110 can project a calculated covariance matrix to a created set of orthogonal vectors in the matrix U. This projection of the covariance matrix (Cov) can be represented by the following:

$$Cov=UAU^H.$$

In this example, the covariance matrix (Cov) can be represented as the project of two matrices. For example, the covariance matrix (Cov) can be calculated based on U and $U^H$ where the matrix U can correspond to the orthogonal vectors α, as described earlier. In addition, the covariance matrix (Cov) can be calculated based on a matrix A, which can represent the projection of the vectors of the covariance matrix (Cov) to the orthogonal basis of the matrix U. The matrix A can be a complex valued matrix, which can have real value elements in the diagonal entries and complex values in the non-diagonal entries. In addition, the matrix A can be a Hermitian matrix. In other words, the matrix A can be equal to a Hermitian conjugated matrix. In one example, to represent the whole matrix A, one half of matrix A corresponding to either the upper diagonal part of matrix A or the lower diagonal part of matrix A can be used, while the rest of the matrix A can be obtained by taking a complex conjugated version of either the lower or upper part.

In one example, the construction of matrix U can be constrained by the codebook W1. Thus, the UE 110 can select the best indexes of the W1 matrix and then construct matrix U. Alternatively, the UE 110 can construct matrix U considering the constraints and then the indexes of W1 can be determined.

In one example, after the UE 110 calculates the covariance matrix (Cov), the UE 110 can determine the orthogonal vectors from the set of $N_t$ orthogonal vectors. The UE 110 can determine the vectors that provide the best base projection of the covariance matrix (Cov) to the corresponding orthogonal vectors in matrix U, which can be done by selecting the best M diagonal values in the matrix A, wherein M is an integer. In other words, the diagonal entries in matrix A can be the projection of vectors from the covariance matrix (Cov) to the orthogonal vectors of matrix U. The UE 110 can look at the diagonal entries of matrix A, and determine the best M diagonal values, which can indicate that most of the energy of the covariance matrix (Cov) is contained in the corresponding M vector direction.

In one example, the M diagonal values or entries can be considered "best" when the M diagonal entries have higher absolute values as compared to other M diagonal entries. For example, if the M diagonal values or entries are sorted from largest absolute value to lowest absolute value, then the M first entries can be considered the M "best" diagonal values or entries.

In one example, after calculating the matrix A at the UE 110, the UE 110 can select the best M diagonal values. In addition, the UE 110 can feedback (i,j) i>j complex value (or magnitude and phase), and i real values where i and j are within selected M indices. The UE 110 can provide this feedback to the base station 120. The base station 120 can receive from the UE 110 the best M indices and other complex and real values, and then the base station 120 can reconstruct the covariance matrix (Cov) using the matrix A (all zeros except the feedback values) and the matrix U.

In one example, in order for the UE 110 to indicate to the base station 120 about the covariance matrix (Cov), the UE 110 can notify the base station 120 on which M out of the $N_t$ vectors provides the maximum values in the matrix A, and along with an indication of the indices of vector α, the UE 110 can also provide the corresponding coefficient in matrix A. For the rest of the lower values, the UE 110 can simply move them out because these lower values do not provide a significant contribution to the total matrix representation.

In one example, after the UE 110 selects the best M diagonal values, the UE 110 can report back to the base station 120. For example, the UE 110 can report a set of indices from $N_t$ vectors (from all indexes from 0 to $N_t-1$). The UE 110 can indicate the indices of the selected vectors. In addition, the UE 110 can report the subset of the complex coefficient elements of matrix A, which can correspond to selected indices of the selected vectors of the orthogonal basis. The base station 120, after receiving this information, can reconstruct the covariance matrix (Cov). The base station 120 can have information on the best vectors α, as determined by the UE 110, based on the indices that are reported from the UE 110. In addition, the base station 120 can have some elements of matrix A. For remaining elements in matrix A for which the UE 110 does not provide information, the base station 120 can assume zero elements in the matrix A. Based on this information, the base station 120 can reconstruct the covariance matrix (Cov). However, instead of the matrix A, the base station 120 can use a quantized version, since not all elements of matrix A are reported by the UE 110 to the base station 120. The base station 120 can determine the quantized version of the covariance matrix, and the base station 120 can use the quantized version of the covariance matrix to support beamforming operation.

In one example, since $(\theta_1, \phi_1)$ can be part of feedback information of Type I, the proposed feedback scheme uses $\log 2(N_t C_M)$, where nCk is n choose k, M real values and $M(M-1)/2$ complex values. Compared to normal feedback that uses Nt real values and $Nt(Nt-1)/2$ complex values, the overhead in the present scheme can be less than 1/10. For example, if Nt=32, M=8, and there are 4 bits in each dimension, then the conventional feedback amount is 2112 bits, while the amount of feedback in the new technique 168 bits, thereby reducing the amount of signaling overhead between the base station and the UE.

In one configuration, the matrix U can be represented as follows:

$$U = \begin{pmatrix} [a(\theta_1, \phi_1)a(\theta_2, \phi_2) \ldots a(\theta_{Nt/2}, \phi_{Nt/2})] & 0_{Nt/2, Nt/2} \\ 0_{Nt/2, Nt/2} & [a(\theta_1, \phi_1)a(\theta_2, \phi_2) \ldots a(\theta_{Nt/2}, \phi_{Nt/2})] \end{pmatrix},$$

where $0_{Nt/2, Nt/2}$ is a $\frac{Nt}{2} \times \frac{Nt}{2}$ zero matrix.

In one example, an antenna array can have cross polarized antennas, such as two cross polarized antennas. In other words, the antenna array can be divided into two antenna arrays—one antenna array can correspond to antenna elements with one polarization, and the other antenna array can correspond to antenna elements of another polarization. In one example, channel elements can be ordered such that channel measurements corresponding to one polarization can be followed by channel measurements corresponding to another polarization. In this case, there can be a special representation of the matrix U, which can have a diagonal structure. In this version of matrix U, the basis can be the same for antenna elements of the first and second polarization. The matrix U can have a different structure as previously described, as the set of orthogonal basis in an upper left portion of the matrix U can be the same as the basis for the lower right portion of the matrix U.

In this case, when the composition of the covariance matrix (Cov) is performed, a matrix Ã (which is another version of matrix A) can have a more generic form. For example, the matrix Ã can have four components—$A_1$, $A_2$, $A_3$ and $A_4$. In this case, $A_2$ and $A_3$ can correspond to the correlation of a channel of different polarizations, and $A_1$ and $A_4$ can correspond to the correlation of a channel for a same antenna polarization. For example, $A_2$ and $A_3$ can correspond to the correlation between antenna elements of different polarizations. As another example, $A_1$ can correspond to the correlation between antenna elements of a first polarization, and $A_4$ can correspond to the correlation between antenna elements of a second polarization. In addition, for the polarization part, $A_2$ and $A_3$ are typically not correlated, and $A_2$ and $A_3$ can be assumed to be equal to 0.

In one example, the UE 110 can provide information to the base station 120 about $A_1$ and $A_4$ only, and the base station 120 can assume that $A_2$ and $A_3$ are equal to 0. The UE 110 can quantize the $A_1$ and $A_4$ that are sent to the base station 120. For example, in a first approach, the UE 110 can independently quantize $A_1$ and $A_4$ and provide this information to the base station. In a second approach, the UE 110 can average $A_1$ and $A_4$, and then the UE 110 can perform quantization of the average matrix A (i.e., the average of $A_1$ and $A_4$). After quantization of matrix A, the UE 110 can provide this information to the base station 120. The base station 120 can use matrix A instead of $A_1$ and $A_4$ to reconstruct the covariance matrix (Cov).

In one configuration, in case of a cross-polarized antenna at the base station, half of a precoding vector can correspond to antenna ports with a given polarization slant, and the other half of a precoding vector can correspond to antenna ports with an orthogonal polarization slant. A basis matrix can be reasonably constructed in this manner, considering that antenna ports with mutually orthogonal polarization slants are low correlated. In one example, in case of the cross-polarized antenna at the base station 120, the dimensions of the A matrix can be reduced from $Nt \times Nt$ to $\frac{Nt}{2} \times \frac{Nt}{2}$.

A matrix Ã can be calculated in accordance with the following:

$\tilde{A} = U^H \text{Cov} U$.

Here, the matrix Ã can be represented as follows:

$$\tilde{A} = \begin{pmatrix} A_1 & A_2 \\ A_3 & A_4 \end{pmatrix},$$

where $A_1$, $A_2$, $A_3$ and $A_4$ are as previously described.

Then, a resulting A matrix can be calculated as follows:

$$A = \frac{(A_1 + A_4)}{2},$$

where A can represent an average matrix A, as previously described. In one example, the UE 110 can perform quantization of the average matrix A (i.e., the average of $A_1$ and $A_4$). After quantization of matrix A, the UE 110 can provide this information to the base station 120. The base station 120 can use matrix A instead of $A_1$ and $A_4$ to reconstruct the covariance matrix (Cov).

In one configuration, a parameterization of the covariance matrix (Cov) can be used. For example, the covariance matrix (Cov) can be represented as follows:

$$\begin{bmatrix} 1 & \rho & \ldots & \rho^{N-1} \\ \rho^* & \beta_1 & & \rho^{N-2} \\ \vdots & \vdots & \ddots & \\ (\rho^*)^{N-1} & (\rho^*)^{N-2} & \ldots & \beta_{N-1} \end{bmatrix}.$$

In this example, between antenna elements or antenna ports, the correlation can be in accordance with a certain polynomial process, which can be described by the parameter $\rho$. For example, between a first and second antenna element (or port), the correlation is $\rho$. Between a first and third antenna element (or port), the correlation is $\rho^2$. Between a first and last antenna element (or port), the correlation is $\rho^{N-1}$, where N is the number of antenna elements or antenna ports. In addition, $\beta$ can represent a transmit power from an $i^{th}$ antenna relative to a transmit power of a first antenna. In this example of the covariance matrix (Cov), $\rho$ is a complex value and $\beta$ is a real value. Under this correlation matrix, the UE 110 can attempt to determine the parameters $\rho$ and $\beta$ that approximate the measured channel matrix. The UE 110 can report this information to the base station. In other words, the UE can report the parameters ρ and β to the base station 120. The base station 120, knowing this functional structure of the covariance matrix, can reconstruct the covariance matrix (Cov) using the parameters ρ and β. In other words, the base station 120 can receive the reported values from the UE 110, which are the parameters ρ and β, and the base station 120 can reconstruct the whole covariance matrix (Cov). In this example, the amount of feedback can be M real values and one complex value, as opposed to the conventional technique of Nt real values and one complex value. In addition, the amount of feedback using the conventional technique would be 136 bits, whereas the amount of feedback in the new technique is 64 bits, thereby reducing the amount of signaling overhead between the UE 110 and the base station 120.

In one configuration, the covariance matrix (Cov) can be represented as the product of three separate covariance matrices. The UE 110 can construct the covariance matrix (Cov) that is represented at the product of three separate covariance matrices.

For example, the covariance matrix (R) can be represented as follows:

$$R = R_{2 \times 2}^{CLA} \otimes R_{N_2 \times N_2}^{ULA} \otimes R_{N_1 \times N_1}^{ULA},$$

where $R_{N_1 \times N_1}^{ULA}$ is a first covariance matrix with respect to a uniform linear array (ULA), $R_{N_2 \times N_2}^{ULA}$ is a second covariance matrix with respect to a ULA, and $R_{2 \times 2}^{CLA}$ is a third covariance matrix with respect to a cross-polarized array (CLA), and $N_1$ and $N_2$ are different dimensions, e.g., horizontal and vertical, respectively.

In this example, $R_{N_1 \times N_1}^{ULA}$ can correspond to the linear antenna array of dimension $N_1$. $N_1$ can be the number of antenna elements in the first dimension, which can be the horizontal dimension. The UE 110 can measure the channel correlation between antenna elements in the horizontal domain (e.g., across the $N_1$ dimension). The UE 110 can create the first covariance matrix of dimension $N_1$ by $N_1$. In addition, $R_{N_2 \times N_2}^{ULA}$ can correspond to the linear antenna array of dimension $N_2$. $N_2$ can be the number of antenna elements in the second dimension, which can be the horizontal dimension. The UE 110 can measure the channel correlation between antenna elements in the vertical domain (e.g., across the $N_2$ dimension). The UE 110 can create the second covariance matrix of dimension $N_2$ by $N_2$. In addition, $R_{2 \times 2}^{CLA}$ can correspond to antenna correlation between two polarizations. For example, the UE 110 can measure the antenna correlation between two polarizations to create the third covariance matrix ($R_{2 \times 2}^{CLA}$), which can be a matrix of dimension 2×2.

In one example, the UE 110 can quantize each of the first covariance matrix, the second covariance matrix, and the third covariance matrix, and then report back to the base station 120. For example, the UE 110 can independently quantize the first covariance matrix, the second covariance matrix and the third covariance matrix, and then report quantization elements to the base station 120. The base station 120 can attempt to reconstruct the whole covariance matrix (R) by using the Kronecker product equation, as described above. For the reporting procedure, the UE 110 can quantize each of the three covariance matrices, and then report quantization coefficients for each covariance matrix to the base station 120. The base station 120 can attempt to reconstruct the whole covariance matrix (R) based on the information received from the UE.

In one example, the UE 110 can select the best M1 and best M2 indices for each dimension (e.g., $N_1$ and $N_2$). For example, if the number of ports for the vertical and horizontal domains is equal to 4 and 4, respectively, then M1=2, M2=2, P=2. In this example, the amount of feedback using the new technique is 6 real values and 3 complex values, which is 54 bits, whereas the amount of feedback using the conventional technique is 10 real values and 13 complex values, which is 144 bits, thereby reducing the amount of signaling overhead between the UE 110 and the base station 120.

In one configuration, the base station 120 can reconstruct the covariance matrix (Cov) for the UE 110. Each UE 110 can have its own covariance matrix. From the covariance matrix (Cov), the base station 120 can determine how to beamform the CSI-RS transmission to the UE 110. In other words, after receiving the covariance matrix (Cov) from the UE 110, the base station 120 can perform beamforming of CSI-RS. In response, the UE 110 can report channel quality indicator (CQI) information to the base station 120, which can indicate an effectiveness of a specific beamforming. In one example, the base station 120 can receive the covariance matrix (Cov) and then beamform the CSI-RS according to the received covariance matrix (Cov), and the process for beamforming the CSI-RS from the received covariance matrix (Cov) can be base station or TRP specific.

In one example, the base station 120 can determine the matrix U (based on UE feedback WI) and beamformed to send beamformed CSI-RS to the UE 110. In this case, the calculated covariance matrix (Cov) at the UE 110 can be equivalent to matrix A since matrix U is already multiplied at the transmitter. The process for determining matrix U can be base station or TRP implementation specific. In addition, this mode of operation can be useful for multiple-user MIMO (MU-MIMO) operation, as the matrix U can be determined based on multiple UE feedbacks.

In one configuration, the base station 120 and the UE 110 can modify the codebook (e.g., the W2 codebook) using the covariance matrix (Cov). For example, the UE 110 can quantize the covariance matrix (Cov) and report the quantized covariance matrix to the base station 120. Both the UE 110 and the base station 120 can perform a modification of the covariance matrix (Cov). A W2 matrix can be the existing codebook (e.g., Class A codebook) from LTE. As an example, the UE 110 can multiply all vectors of this codebook by the matrix Q, which can be calculated from the quantized covariance matrix. This procedure for modifying the codebook can be performed in a same manner between the base station 120 and the UE 110. A transformation of the W2 codebook can be applied according to the matrix Q, which can be derived from the quantized covariance matrix A. Both the base station 120 and the UE 110 can be predetermined to calculate the matrix Q, which can be derived from the quantized covariance matrix A, and modify the codebook. For reporting (e.g., PMI/CQI reporting), both the base station 120 and the UE 110 can use the same updated codebook W, which can be derived from QW2, where Q is derived from the quantized version of the covariance matrix A.

In one example, along with the covariance matrix feedback, the UE 110 can also feedback the W2 matrix. In this case, the UE 110 can assume that the final precoding matrix W applied at the base station 120 is represented by the following: W=QW2, where Q is an Nt×M matrix, and Q is calculated from the matrix A using a predefined technique known at the base station 120 and the UE 110. For example, the matrix Q can be constructed from eigenvectors of the covariance matrix (Cov) obtained at the base station 120 after the UE 110 feeds back the A matrix in accordance with Cov=UAU$^H$. One example of the W2 matrix is defined in LTE Advanced CSI. In this case, each element of the W2 matrix is quantized to quadrature phase-shift keying (QPSK). Another example of the W2 matrix is direction quantization of each element in terms of magnitude and phase.

In one configuration, a UE 110 can construct an orthonormal basis matrix U based on a best W1 index, and then calculate $A=U^H \text{Cov} U$, where Cov is a calculated covariance matrix at the UE 110. Then, the UE 110 can determine the best M diagonal entries of the matrix A, and feedback those indices to the base station 120. The feedback (i,j) is i>j complex values (or magnitude and phase), and i real values, where i and j are within the selected M indices.

In one example, the UE 110 can feedback only one complex value $\rho$ and M real values (e.g., best M values selected at the UE) in accordance with the following covariance matrix (Cov) representation:

$$\begin{bmatrix} 1 & \rho & \cdots & \rho^{N-1} \\ \rho^* & \beta_1 & & \rho^{N-2} \\ \vdots & \vdots & \ddots & \\ (\rho^*)^{N-1} & (\rho^*)^{N-2} & \cdots & \beta_{N-1} \end{bmatrix}.$$

In one example, the UE 110 can construct the covariance matrix in accordance with the following:

$$R = R_{2 \times 2}^{CLA} \otimes R_{N_2 \times N_2}^{ULA} \otimes R_{N_1 \times N_1}^{ULA}.$$

In one configuration, the base station 120 can send a beamformed CSI-RS to the UE 110. Based on the beamformed CSI-RS, the UE 110 can calculate a covariance matrix (Cov). The UE 110 can treat the calculated covariance matrix as matrix A, as previously discussed. The UE 110 can determine the best M diagonal entries of the matrix A, and feedback those indices to the base station 120.

In one example, the base station 120 can use UE(s) feedback of W1 (e.g., best W1 index) to determine a precoder (or beamformer). In other words, information received from the UE 110 can be used at the base station 120 to support beamforming.

In one example, the dimensions of matrix A can be reduced from Nt×Nt to $$\frac{Nt}{2} \times \frac{Nt}{2}$$

in the case of cross-polarized antennas at the base station 120. In another example, the UE 110 can divide matrix A into four matrices, and the UE 110 can calculate an average matrix from two of those matrices correspond to different polarizations.

In one example, the UE 110 can assume that the final precoding matrix W applied at the base station 120 is obtained from the following: W=QW2. The matrix Q can be calculated using a predefined technique known at the base station 120 and at the UE 110. For example, the matrix Q can be constructed from eigenvectors of matrix T, which can be calculated from matrix A. The matrix T can be obtained in accordance with the following: $T=UAU^H$.

In one example, the UE feedback can include W2 feedback.

In one example, the UE 110 can feedback only M real values (e.g., best M values selected at the UE 110) according to the covariance matrix representation as follows:

$$\begin{bmatrix} 1 & \rho & \cdots & \rho^{N-1} \\ \rho^* & \beta_1 & & \rho^{N-2} \\ \vdots & \vdots & \ddots & \\ (\rho^*)^{N-1} & (\rho^*)^{N-2} & \cdots & \beta_{N-1} \end{bmatrix}.$$

Figure 2:
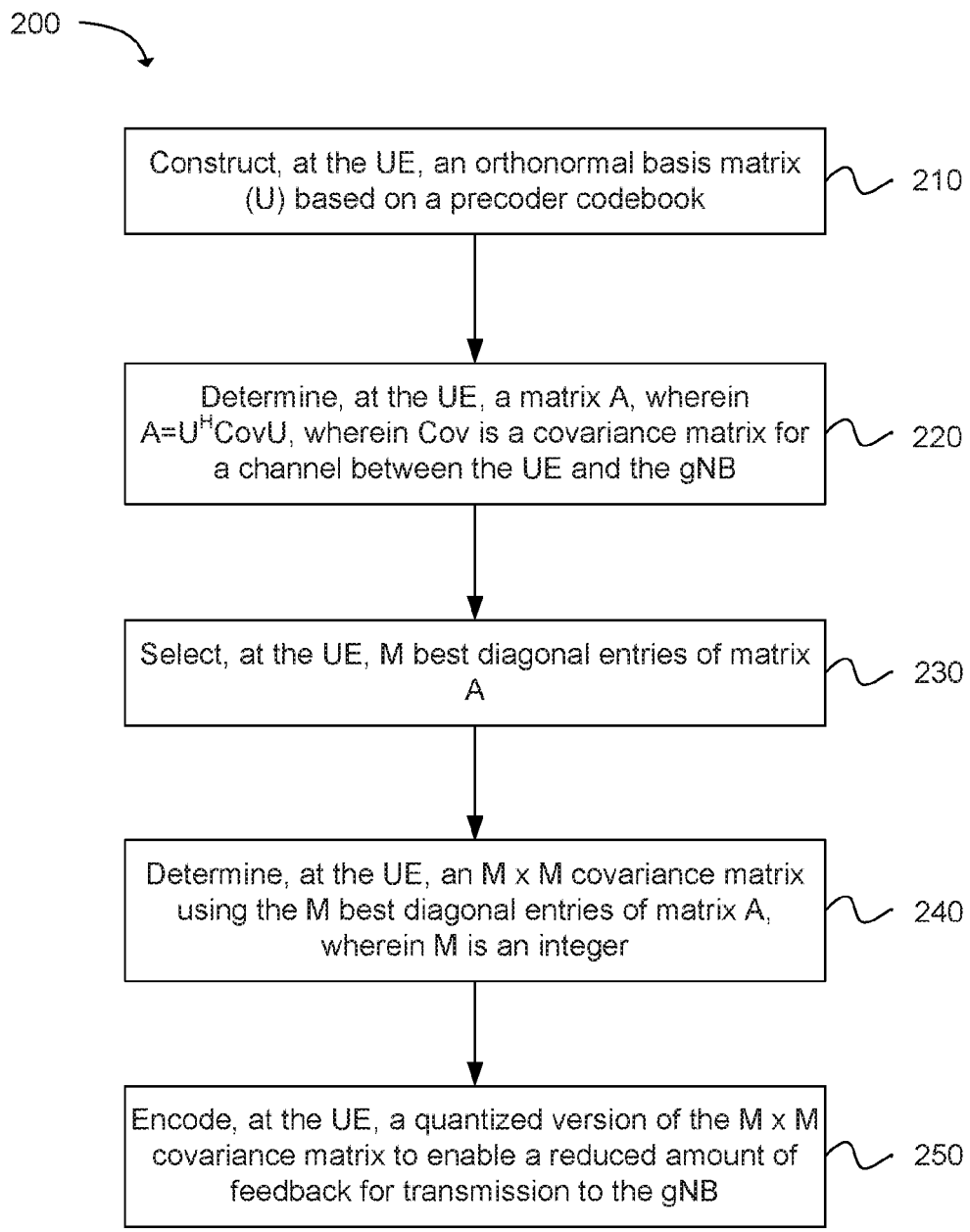
FIG. 2 depicts functionality of a user equipment (UE) operable to encode a covariance matrix for transmission to a Next Generation NodeB (gNB) in accordance with an example.

Another example provides functionality 200 of a user equipment (UE) operable to encode a covariance matrix for transmission to a Next Generation NodeB (gNB), as shown in FIG. 2. The UE can comprise one or more processors configured to: construct, at the UE, an orthonormal basis matrix (U) based on a precoder codebook, as in block 210. The UE can comprise one or more processors configured to: determine, at the UE, a matrix A, wherein $A=U^H \text{Cov} U$, wherein Cov is a covariance matrix for a channel between the UE and the gNB, as in block 220. The UE can comprise one or more processors configured to: select, at the UE, M best diagonal entries of matrix A, as in block 230. The UE can comprise one or more processors configured to: determine, at the UE, an M×M covariance matrix using the M best diagonal entries of matrix A, wherein M is an integer, as in block 240. The UE can comprise one or more processors configured to: encode, at the UE, a quantized version of the M×M covariance matrix to enable a reduced amount of feedback for transmission to the gNB, as in block 250. In addition, the UE can comprise a memory interface configured to retrieve from a memory the quantized version of the M×M covariance matrix.

Figure 3:
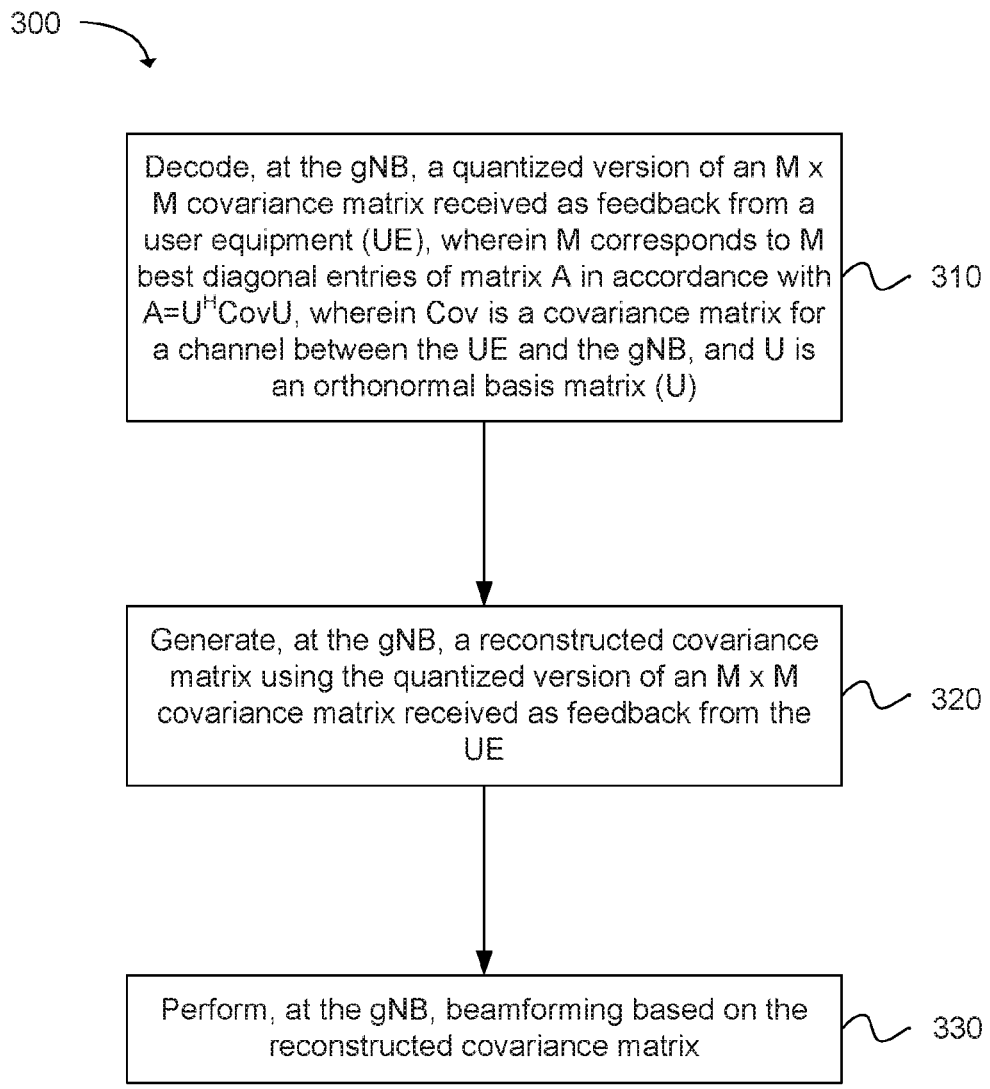
FIG. 3 depicts functionality of a Next Generation NodeB (gNB) operable to perform beamforming in accordance with an example.

Another example provides functionality 300 of a Next Generation NodeB (gNB) operable to perform beamforming, as shown in FIG. 3. The gNB can comprise one or more processors configured to: decode, at the gNB, a quantized version of an M×M covariance matrix received as feedback from a user equipment (UE), wherein M corresponds to M best diagonal entries of matrix A in accordance with $A=U^H \text{Cov} U$, wherein Cov is a covariance matrix for a channel between the UE and the gNB, and U is an orthonormal basis matrix (U), as in block 310. The gNB can comprise one or more processors configured to: generate, at the gNB, a reconstructed covariance matrix using the quantized version of an M×M covariance matrix received as feedback from the UE, as in block 320. The gNB can comprise one or more processors configured to: perform, at the gNB, beamforming based on the reconstructed covariance matrix, as in block 330. In addition, the gNB can comprise a memory interface configured to send to a memory the quantized version of an M×M covariance matrix.

Figure 4:
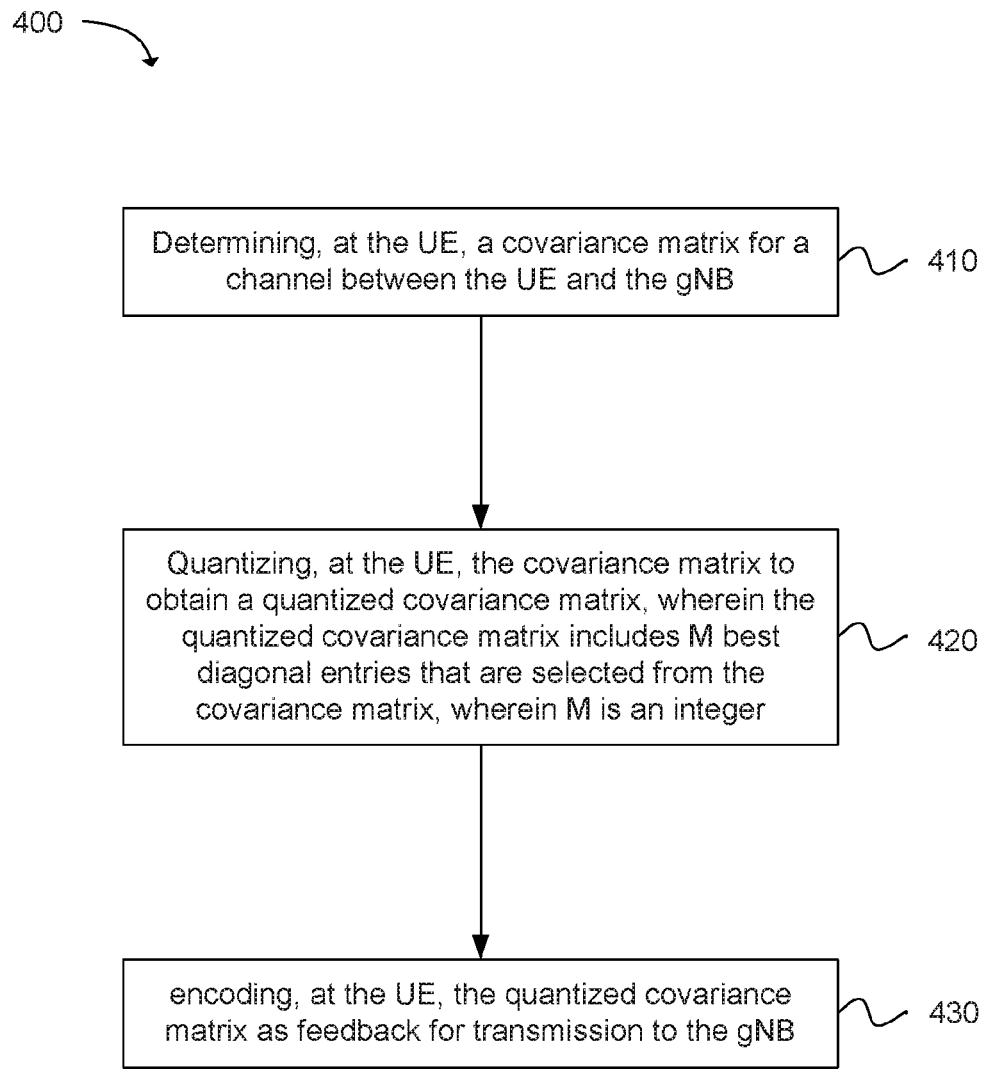
FIG. 4 depicts a flowchart of a machine readable storage medium having instructions embodied thereon for assisting a Next Generation NodeB (gNB) for beamforming in accordance with an example.

Another example provides at least one machine readable storage medium having instructions 400 embodied thereon for assisting a Next Generation NodeB (gNB) for beamforming, as shown in FIG. 4. The instructions can be executed on a machine, where the instructions are included on at least one computer readable medium or one non-transitory machine readable storage medium. The instructions when executed by one or more processors of a user equipment (UE) perform: determining, at the UE, a covariance matrix for a channel between the UE and the gNB, as in block 410. The instructions when executed by one or more processors of the UE perform: quantizing, at the UE, the covariance matrix to obtain a quantized covariance matrix, wherein the quantized covariance matrix includes M best diagonal entries that are selected from the covariance matrix, wherein M is an integer, as in block 420. The instructions when executed by one or more processors of the UE perform: encoding, at the UE, the quantized covariance matrix as feedback for transmission to the gNB, as in block 430.

Figure 5:
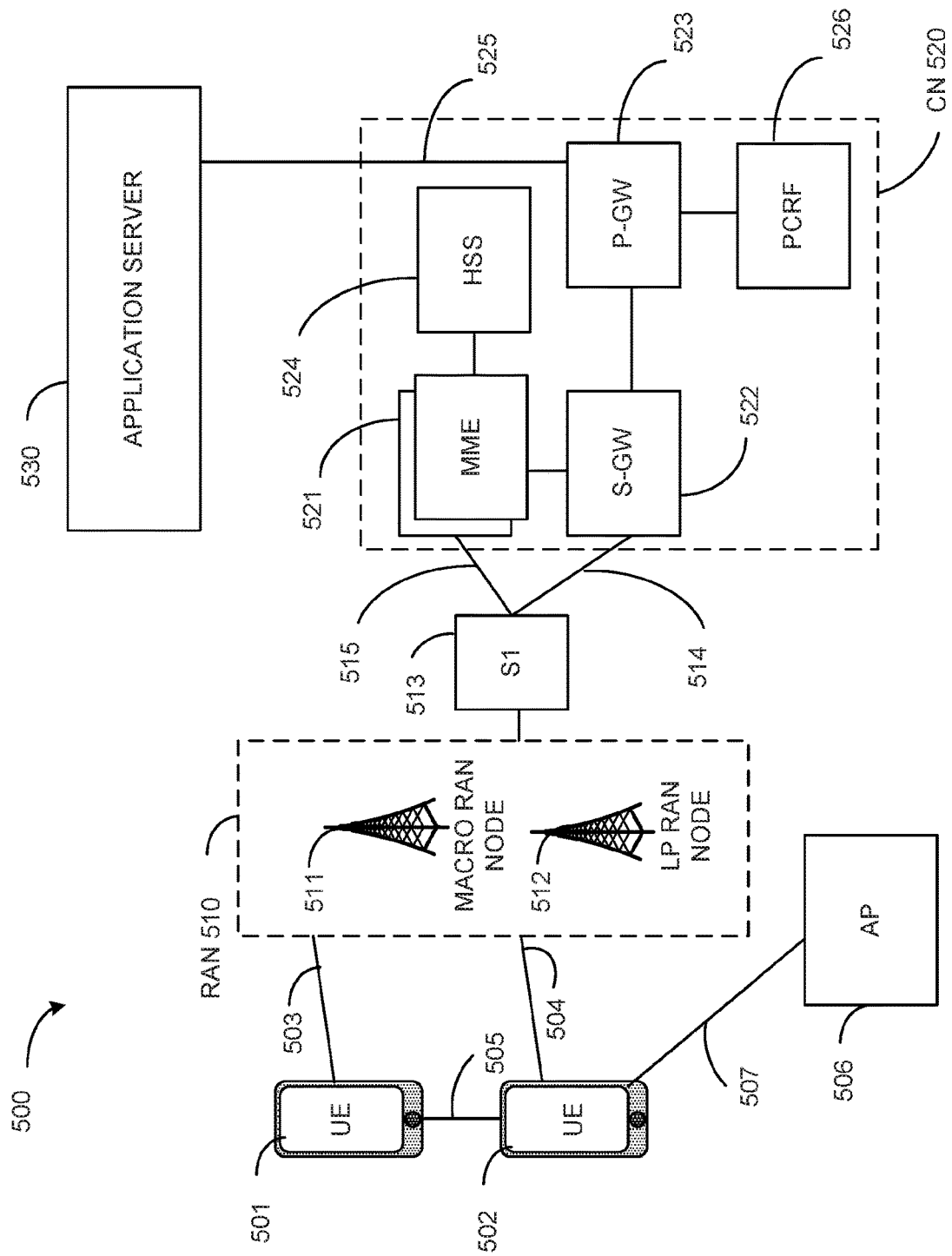
FIG. 5 illustrates an architecture of a wireless network in accordance with an example.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 602.15 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network 523 and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
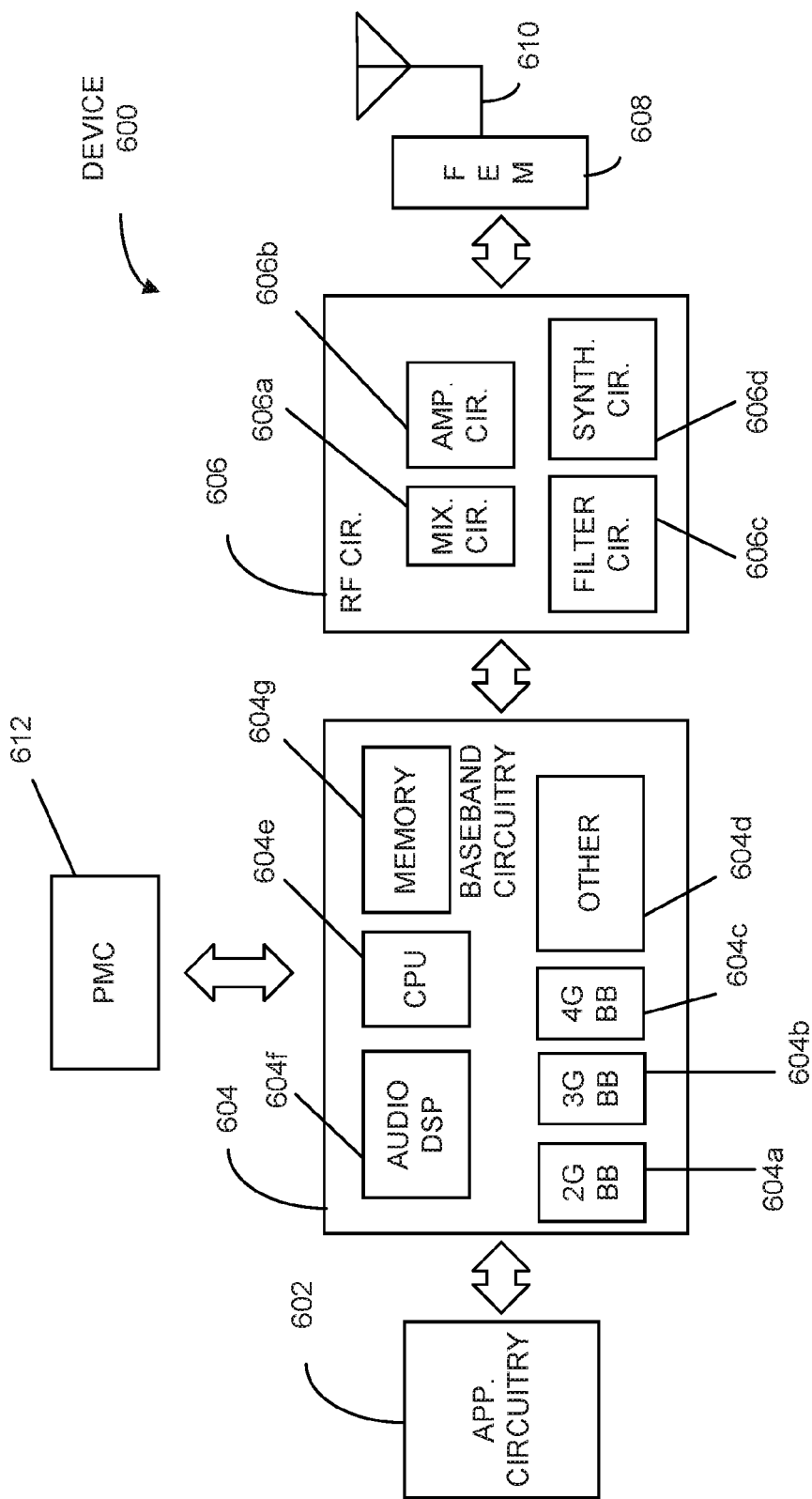
FIG. 6 illustrates a diagram of a wireless device (e.g., UE) in accordance with an example.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuity 604 may interface with the application circuitry 602 for generation and processing of the baseband signals and for controlling operations of the RF circuitry 606. For example, in some embodiments, the baseband circuitry 604 may include a third generation (3G) baseband processor 604*a*, a fourth generation (4G) baseband processor 604*b*, a fifth generation (5G) baseband processor 604*c*, or other baseband processor(s) 604*d* for other existing generations, generations in development or to be developed in the future (e.g., second generation (2G), sixth generation (6G), etc.). The baseband circuitry 604 (e.g., one or more of baseband processors 604*a-d*) may handle various radio control functions that enable communication with one or more radio networks via the RF circuitry 606. In other embodiments, some or all of the functionality of baseband processors 604*a-d* may be included in modules stored in the memory 604*g* and executed via a Central Processing Unit (CPU) 604*e*. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604*f*. The audio DSP(s) 604*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606*a*, amplifier circuitry 606*b* and filter circuitry 606*c*. In some embodiments, the transmit signal path of the RF circuitry 606 may include filter circuitry 606*c* and mixer circuitry 606*a*. RF circuitry 606 may also include synthesizer circuitry 606*d* for synthesizing a frequency for use by the mixer circuitry 606*a* of the receive signal path and the transmit signal path. In some embodiments, the mixer circuitry 606*a* of the receive signal path may be configured to down-convert RF signals received from the FEM circuitry 608 based on the synthesized frequency provided by synthesizer circuitry 606*d*. The amplifier circuitry 606*b* may be configured to amplify the down-converted signals and the filter circuitry 606*c* may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a necessity. In some embodiments, mixer circuitry 606*a* of the receive signal path may comprise passive mixers, although the scope of the embodiments is not limited in this respect.

In some embodiments, the mixer circuitry 606*a* of the transmit signal path may be configured to up-convert input baseband signals based on the synthesized frequency provided by the synthesizer circuitry 606*d* to generate RF output signals for the FEM circuitry 608. The baseband signals may be provided by the baseband circuitry 604 and may be filtered by filter circuitry 606*c*.

In some embodiments, the mixer circuitry 606*a* of the receive signal path and the mixer circuitry 606*a* of the transmit signal path may include two or more mixers and may be arranged for quadrature downconversion and upconversion, respectively. In some embodiments, the mixer circuitry 606*a* of the receive signal path and the mixer circuitry 606*a* of the transmit signal path may include two or more mixers and may be arranged for image rejection (e.g., Hartley image rejection). In some embodiments, the mixer circuitry 606*a* of the receive signal path and the mixer circuitry 606*a* may be arranged for direct downconversion and direct upconversion, respectively. In some embodiments, the mixer circuitry 606*a* of the receive signal path and the mixer circuitry 606*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606$d$ may be a fractional-N synthesizer or a fractional N/N+1 synthesizer, although the scope of the embodiments is not limited in this respect as other types of frequency synthesizers may be suitable. For example, synthesizer circuitry 606$d$ may be a delta-sigma synthesizer, a frequency multiplier, or a synthesizer comprising a phase-locked loop with a frequency divider.

The synthesizer circuitry 606$d$ may be configured to synthesize an output frequency for use by the mixer circuitry 606$a$ of the RF circuitry 606 based on a frequency input and a divider control input. In some embodiments, the synthesizer circuitry 606$d$ may be a fractional N/N+1 synthesizer.

In some embodiments, frequency input may be provided by a voltage controlled oscillator (VCO), although that is not a necessity. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606$d$ of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop.

In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606$d$ may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

While FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
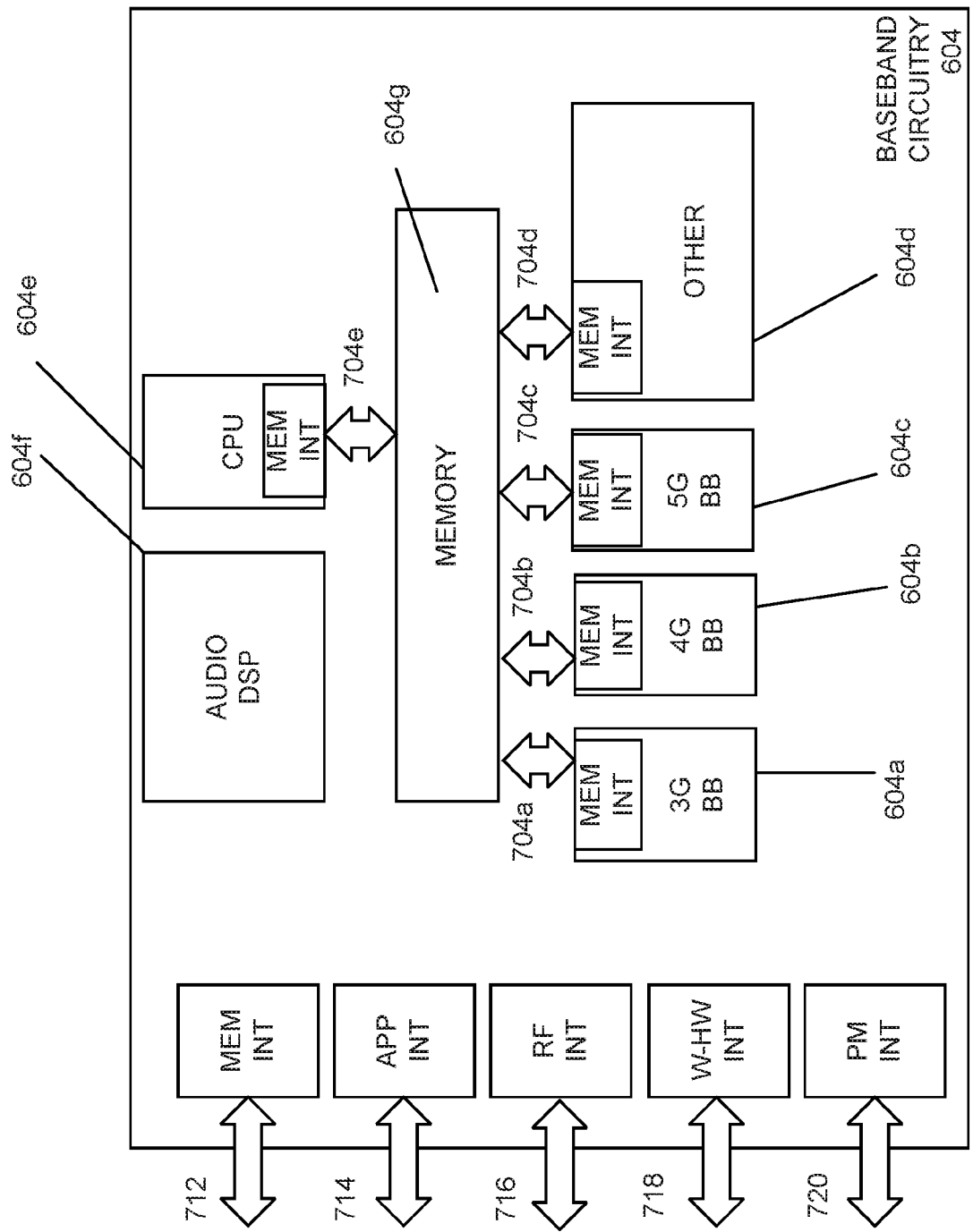
FIG. 7 illustrates interfaces of baseband circuitry in accordance with an example.

FIG. 7 illustrates example interfaces of baseband circuitry in accordance with some embodiments. As discussed above, the baseband circuitry 604 of FIG. 6 may comprise processors 604a-604e and a memory 604g utilized by said processors. Each of the processors 604a-604e may include a memory interface, 704a-704e, respectively, to send/receive data to/from the memory 604g.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
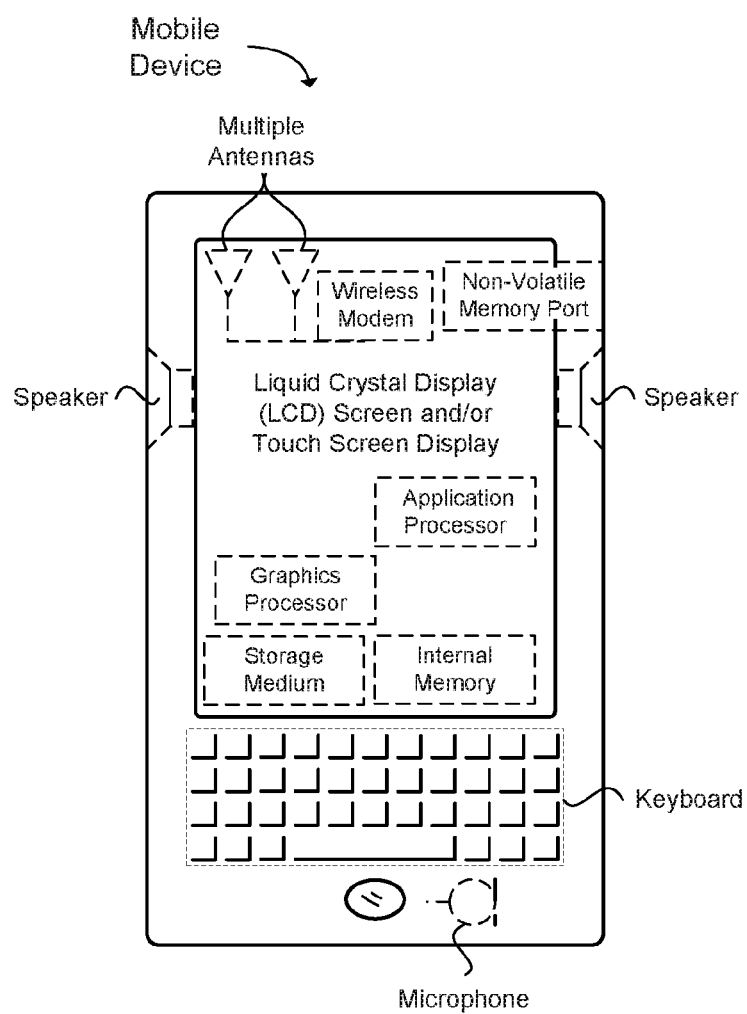
FIG. 8 illustrates a diagram of a wireless device (e.g., UE) in accordance with an example.

FIG. 8 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN) or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 8 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to encode a covariance matrix for transmission to a Next Generation NodeB (gNB), the apparatus comprising: one or more processors configured to: construct, at the UE, an orthonormal basis matrix (U) based on a precoder codebook; determine, at the UE, a matrix A, wherein $A=U^H CovU$, wherein Cov is a covariance matrix for a channel between the UE and the gNB; select, at the UE, M best diagonal entries of matrix A; determine, at the UE, an M×M covariance matrix using the M best diagonal entries of matrix A, wherein M is an integer; and encode, at the UE, a quantized version of the M×M covariance matrix to enable a reduced amount of feedback for transmission to the gNB; and a memory interface configured to retrieve from a memory the quantized version of the M×M covariance matrix.

Example 2 includes the apparatus of Example 1, further comprising a transceiver configured to transmit the quantized version of the M×M covariance matrix to the gNB.

Example 3 includes the apparatus of Examples 1 to 2, wherein the one or more processors are configured to: determine the covariance matrix (Cov) in accordance with the following: $Cov=UAU^H$, wherein U is the orthogonal basis matrix that consists of an Nt orthogonal basis where Nt corresponds to a number of transmit antennas, A is a matrix that represents a projection of vectors of the covariance matrix (Cov) to an orthogonal basis in matrix U, and $U^H$ is a Hermitian of matrix U.

Example 4 includes the apparatus of Examples 1 to 3, wherein the one or more processors are further configured to reduce a dimension of matrix A from Nt×Nt to $$\frac{Nt}{2} \times \frac{Nt}{2}$$

when cross-polarized antennas are used at the gNB, wherein Nt represents a number of transmit antennas.

Example 5 includes the apparatus of Examples 1 to 4, wherein the one or more processors are further configured to: divide the matrix A into four sub-matrices; and calculate an average matrix from two of the four sub-matrices corresponding to different antenna polarizations.

Example 6 includes the apparatus of Examples 1 to 5, wherein the one or more processors are further configured to: determine that a final precoding matrix (W) to be applied at the gNB is in accordance with: W=QW2, wherein matrix Q is derived from the matrix A and is an Nt×M matrix, where Nt represents a number of transmit antennas, wherein matrix W2 is fed back from the UE to the gNB, and each element of matrix W2 is quantized.

Example 7 includes the apparatus of Examples 1 to 6, wherein the one or more processors are configured to support covariance matrix compression using Type I feedback to reduce a signaling overhead between the UE and the gNB, wherein the covariance matrix compression involves encoding the quantized version of the M×M covariance matrix as feedback for transmission to the gNB.

Example 8 includes the apparatus of Examples 1 to 7, wherein the one or more processors are configured to: decode one of a precoded channel state information reference signal (CSI-RS) or a non-precoded CSI-RS that is received from the gNB; and determine the covariance matrix based on the pre-coded CSI-RS or the non-precoded CSI-RS.

Example 9 includes the apparatus of Examples 1 to 8, wherein the one or more processors are configured to encode the feedback for transmission to the gNB, wherein the feedback includes indices associated with the M best diagonal entries of matrix A to enable the gNB to reconstruct the covariance matrix and determine a precoder or beamformer.

Example 10 includes the apparatus of Examples 1 to 9, wherein the one or more processors are configured to: determine the covariance matrix (Cov) in accordance with the following:

$$\begin{bmatrix} 1 & \rho & \cdots & \rho^{N-1} \\ \rho^* & \beta_1 & & \rho^{N-2} \\ \vdots & \vdots & \ddots & \\ (\rho^*)^{N-1} & (\rho^*)^{N-2} & \cdots & \beta_{N-1} \end{bmatrix},$$

wherein $\rho$ represents a correlation between antenna ports and $\beta$ represents a transmit power from an $i^{th}$ antenna relative to a transmit power of a first antenna; and encode the M best diagonal entries of matrix A and $\rho$ as feedback for transmission to the gNB.

Example 11 includes the apparatus of Examples 1 to 10, wherein the one or more processors are further configured to: determine a covariance matrix (R) in accordance with the following: $R = R_{2 \times 2}^{CLA} \otimes R_{N_2 \times N_2}^{ULA} \otimes R_{N_1 \times N_1}^{ULA}$, wherein $R_{N_1 \times N_1}^{ULA}$ is a first covariance matrix that corresponds to a linear antenna array of dimension $N_1$, $R_{N_2 \times N_2}^{ULA}$ is a second covariance matrix that corresponds to a linear antenna array of dimension $N_2$, and $R_{2 \times 2}^{CLA}$ is a third covariance matrix that corresponds to an antenna correlation between two antenna polarizations; quantize the first covariance matrix, the second covariance matrix and the third covariance matrix; and report a quantized first covariance matrix, a quantized second covariance matrix and a quantized third covariance matrix to the gNB to enable the gNB to reconstruct the covariance matrix (R) for beamforming.

Example 12 includes an apparatus of a Next Generation NodeB (gNB) operable to perform beamforming, the apparatus comprising: one or more processors configured to: decode, at the gNB, a quantized version of an M×M covariance matrix received as feedback from a user equipment (UE), wherein M corresponds to M best diagonal entries of matrix A in accordance with $A = U^H \text{Cov} U$, wherein Cov is a covariance matrix for a channel between the UE and the gNB, and U is an orthonormal basis matrix (U); generate, at the gNB, a reconstructed covariance matrix using the quantized version of an M×M covariance matrix received as feedback from the UE; and perform, at the gNB, beamforming based on the reconstructed covariance matrix; and a memory interface configured to send to a memory the quantized version of an M×M covariance matrix.

Example 13 includes the apparatus of Example 12, wherein the covariance matrix (Cov) is in accordance with the following: $\text{Cov} = UAU^H$, wherein U is an orthogonal basis matrix that consists of an Nt orthogonal basis where Nt corresponds to a number of transmit antennas, A is a matrix that represents a projection of vectors of the covariance matrix (Cov) to an orthogonal basis in matrix U, and $U^H$ is a Hermitian of matrix U, wherein the M entries are selected at the UE from the matrix A.

Example 14 includes the apparatus of Examples 12 to 13, wherein the one or more processors are configured to: decode the feedback received from the UE, wherein the feedback includes indices associated with the M best diagonal entries of matrix A; and generate the reconstructed covariance matrix based on the feedback to determine a precoder or beamformer to be used for beamforming.

Example 15 includes at least one machine readable storage medium having instructions embodied thereon for assisting a Next Generation NodeB (gNB) for beamforming, the instructions when executed by one or more processors of a user equipment (UE) perform the following: determining, at the UE, a covariance matrix for a channel between the UE and the gNB; quantizing, at the UE, the covariance matrix to obtain a quantized covariance matrix, wherein the quantized covariance matrix includes M best diagonal entries that are selected from the covariance matrix, wherein M is an integer; and encoding, at the UE, the quantized covariance matrix as feedback for transmission to the gNB.

Example 16 includes the at least one machine readable storage medium of Example 15, further comprising instructions when executed perform the following: determining the covariance matrix (Cov) in accordance with the following: $\text{Cov} = UAU^H$, wherein U is an orthogonal basis matrix that consists of an Nt orthogonal basis where Nt corresponds to a number of transmit antennas, A is a matrix that represents a projection of vectors of the covariance matrix (Cov) to an orthogonal basis in matrix U, and $U^H$ is a Hermitian of matrix U, wherein the M entries are selected at the UE from the matrix A.

Example 17 includes the at least one machine readable storage medium of any of Examples 15 to 16, further comprising instructions when executed perform the following: reducing a dimension of matrix A from Nt×Nt to $$\frac{Nt}{2} \times \frac{Nt}{2}$$

when cross-polarized antennas are used at the gNB, wherein Nt represents a number of transmit antennas.

Example 18 includes the at least one machine readable storage medium of any of Example 15 to 17, further comprising instructions when executed perform the following: dividing the matrix A into four sub-matrices; and calculating an average matrix from two of the four sub-matrices corresponding to different antenna polarizations.

Example 19 includes the at least one machine readable storage medium of any of Example 15 to 18, further comprising instructions when executed perform the following: determining that a final precoding matrix (W) to be applied at the gNB is in accordance with: W=QW2, wherein matrix Q is derived from the matrix A and is an Nt×M matrix, where Nt represents a number of transmit antennas, wherein matrix W2 is fed back from the UE to the gNB, and each element of matrix W2 is quantized.

Example 20 includes the at least one machine readable storage medium of any of Example 15 to 19, further comprising instructions when executed perform the following: supporting covariance matrix compression using Type I feedback to reduce a signaling overhead between the UE and the gNB, wherein the covariance matrix compression involves encoding the quantized covariance matrix as feedback for transmission to the gNB.

Example 21 includes the at least one machine readable storage medium of any of Example 15 to 20, further comprising instructions when executed perform the following: decoding one of a precoded channel state information reference signal (CSI-RS) or a non-precoded CSI-RS that is received from the gNB; and determining the covariance matrix based on the pre-coded CSI-RS or the non-precoded CSI-RS.

Example 22 includes the at least one machine readable storage medium of any of Example 15 to 21, further comprising instructions when executed perform the following: determining the covariance matrix (Cov) in accordance with the following:

$$\begin{bmatrix} 1 & \rho & \cdots & \rho^{N-1} \\ \rho^* & \beta_1 & & \rho^{N-2} \\ \vdots & \vdots & \ddots & \\ (\rho^*)^{N-1} & (\rho^*)^{N-2} & \cdots & \beta_{N-1} \end{bmatrix},$$

wherein $\rho$ represents a correlation between antenna ports and $\beta$ represents a transmit power from an $i^{th}$ antenna relative to a transmit power of a first antenna; and encoding the M best diagonal entries of matrix A and $\rho$ as feedback for transmission to the gNB.

Example 23 includes the at least one machine readable storage medium of any of Example 15 to 22, further comprising instructions when executed perform the following: determining the covariance matrix (R) in accordance with the following: $R = R_{2 \times 2}^{CLA} \otimes R_{N_2 \times N_2}^{ULA} \otimes R_{N_1 \times N_1}^{ULA}$, wherein $R_{N_1 \times N_1}^{ULA}$ is a first covariance matrix that corresponds to a linear antenna array of dimension $N_1$, $R_{N_2 \times N_2}^{ULA}$ is a second covariance matrix that corresponds to a linear antenna array of dimension $N_2$, and $R_{2 \times 2}^{CLA}$ is a third covariance matrix that corresponds to an antenna correlation between two antenna polarizations; quantizing the first covariance matrix, the second covariance matrix and the third covariance matrix; and reporting a quantized first covariance matrix, a quantized second covariance matrix and a quantized third covariance matrix to the gNB to enable the gNB to reconstruct the covariance matrix (R) for beamforming.

Example 24 includes a user equipment (UE) operable to assist a Next Generation NodeB (gNB) for beamforming, the UE comprising: means for determining, at the UE, a covariance matrix for a channel between the UE and the gNB; means for quantizing, at the UE, the covariance matrix to obtain a quantized covariance matrix, wherein the quantized covariance matrix includes M best diagonal entries that are selected from the covariance matrix, wherein M is an integer; and means for encoding, at the UE, the quantized covariance matrix as feedback for transmission to the gNB.

Example 25 includes the UE of Example 24, further comprising: means for determining the covariance matrix (Cov) in accordance with the following: $Cov = UAU^H$, wherein U is an orthogonal basis matrix that consists of an Nt orthogonal basis where Nt corresponds to a number of transmit antennas, A is a matrix that represents a projection of vectors of the covariance matrix (Cov) to an orthogonal basis in matrix U, and $U^H$ is a Hermitian of matrix U, wherein the M entries are selected at the UE from the matrix A.

Example 26 includes the UE of Examples 24 to 25, further comprising: means for reducing a dimension of matrix A from Nt×Nt to $$\frac{Nt}{2} \times \frac{Nt}{2}$$

when cross-polarized antennas are used at the gNB, wherein Nt represents a number of transmit antennas.

Example 27 includes the UE of any of Example 24 to 26, further comprising: means for dividing the matrix A into four sub-matrices; and calculating an average matrix from two of the four sub-matrices corresponding to different antenna polarizations.

Example 28 includes the UE of any of Example 24 to 27, further comprising: means for determining that a final precoding matrix (W) to be applied at the gNB is in accordance with: W=QW2, wherein matrix Q is derived from the matrix A and is an Nt×M matrix, where Nt represents a number of transmit antennas, wherein matrix W2 is fed back from the UE to the gNB, and each element of matrix W2 is quantized.

Example 29 includes the UE of any of Example 24 to 28, further comprising: means for supporting covariance matrix compression using Type I feedback to reduce a signaling overhead between the UE and the gNB, wherein the covariance matrix compression involves encoding the quantized covariance matrix as feedback for transmission to the gNB.

Example 30 includes the UE of any of Example 24 to 29, further comprising: means for decoding one of a precoded channel state information reference signal (CSI-RS) or a non-precoded CSI-RS that is received from the gNB; and determining the covariance matrix based on the pre-coded CSI-RS or the non-precoded CSI-RS.

Example 31 includes the UE of any of Example 24 to 30, further comprising: means for determining the covariance matrix (Cov) in accordance with the following:

$$\begin{bmatrix} 1 & \rho & \cdots & \rho^{N-1} \\ \rho^* & \beta_1 & & \rho^{N-2} \\ \vdots & \vdots & \ddots & \\ (\rho^*)^{N-1} & (\rho^*)^{N-2} & \cdots & \beta_{N-1} \end{bmatrix},$$

wherein $\rho$ represents a correlation between antenna ports and $\beta$ represents a transmit power from an $i^{th}$ antenna relative to a transmit power of a first antenna; and encoding the M best diagonal entries of matrix A and $\rho$ as feedback for transmission to the gNB.

Example 32 includes the UE of any of Example 24 to 31, further comprising: means for determining the covariance matrix (R) in accordance with the following: $R = R_{2 \times 2}^{CLA} \otimes R_{N_2 \times N_2}^{ULA} \otimes R_{N_1 \times N_1}^{ULA}$, wherein $R_{N_1 \times N_1}^{ULA}$ is a first covariance matrix that corresponds to a linear antenna array of dimension $N_1$, $R_{N_2 \times N_2}^{ULA}$ is a second covariance matrix that corresponds to a linear antenna array of dimension $N_2$, and $R_{2 \times 2}^{CLA}$ is a third covariance matrix that corresponds to an antenna correlation between two antenna polarizations; quantizing the first covariance matrix, the second covariance matrix and the third covariance matrix; and reporting a quantized first covariance matrix, a quantized second covariance matrix and a quantized third covariance matrix to the gNB to enable the gNB to reconstruct the covariance matrix (R) for beamforming.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a user equipment (UE) operable to encode a covariance matrix for transmission to a base station, the apparatus comprising:
one or more processors configured to:
construct, at the UE, an orthonormal basis matrix (U) based on a precoder codebook;
determine, at the UE, a matrix A, wherein $A = U^H \text{Cov} U$, wherein Cov is a covariance matrix for a channel between the UE and the base station and $U^H$ is a Hermitian the orthonormal base matrix (U);

reduce a dimension of the matrix A from Nt×Nt to $$\frac{Nt}{2} \times \frac{Nt}{2}$$

when cross-polarized antennas are used at the base station, wherein Nt represents a number of transmit antennas;
select, at the UE, M best diagonal entries of matrix A;
determine, at the UE, an M×M covariance matrix using the M best diagonal entries of matrix A, wherein M is an integer; and
encode, at the UE, a quantized version of the M×M covariance matrix to enable a reduced amount of feedback for transmission to the base station; and
a memory interface configured to retrieve from a memory the quantized version of the M×M covariance matrix.

2. The apparatus of claim 1, further comprising a transceiver configured to transmit the quantized version of the M× M covariance matrix to the base station.

3. The apparatus of claim 1, wherein the one or more processors are further configured to:
divide the matrix A into four sub-matrices; and
calculate an average matrix from two of the four sub-matrices corresponding to different antenna polarizations.

4. The apparatus of claim 1, wherein the one or more processors are further configured to:
determine that a final precoding matrix (W) to be applied at the base station is in accordance with: W=QW2,
wherein matrix Q is derived from the matrix A and is an Nt× M matrix,
wherein matrix W2 is fed back from the UE to the base station, and each element of matrix W2 is quantized.

5. The apparatus of claim 1, wherein the one or more processors are configured to support covariance matrix compression using Type I feedback to reduce a signaling overhead between the UE and the base station, wherein the covariance matrix compression involves encoding the quantized version of the M× M covariance matrix as feedback for transmission to the base station.

6. The apparatus of claim 1, wherein the one or more processors are configured to:
decode one of a precoded channel state information reference signal (CSI-RS) or a non-precoded CSI-RS that is received from the base station; and
determine the covariance matrix based on the pre-coded CSI-RS or the non-precoded CSI-RS.

7. The apparatus of claim 4, wherein the one or more processors are configured to encode the feedback for transmission to the base station, wherein the feedback includes indices associated with the M best diagonal entries of matrix A to enable the base station to reconstruct the covariance matrix and determine a precoder or beamformer.

8. The apparatus of claim 1, wherein the one or more processors are configured to:
determine the covariance matrix (Cov) in accordance with the following:

$$\begin{bmatrix} 1 & \rho & \cdots & \rho^{N-1} \\ \rho^* & \beta_1 & & \rho^{N-2} \\ \vdots & \vdots & \ddots & \\ (\rho^*)^{N-1} & (\rho^*)^{N-2} & \cdots & \beta_{N-1} \end{bmatrix},$$

wherein $\rho$ represents a correlation between antenna ports and $\beta$ represents a transmit power from an $i^{th}$ antenna relative to a transmit power of a first antenna; and
encode the M best diagonal entries of matrix A and $\rho$ as feedback for transmission to the base station.

9. The apparatus of claim 1, wherein the one or more processors are further configured to:
determine a covariance matrix (R) in accordance with the following:

$$R = R_{2 \times 2}^{CLA} \otimes R_{N_2 \times N_2}^{ULA} \otimes R_{N_1 \times N_1}^{ULA},$$

wherein $R_{N_1 \times N_1}^{ULA}$ is a first covariance matrix that corresponds to a linear antenna array of dimension $N_1$, $R_{N_2 \times N_2}^{ULA}$ is a second covariance matrix that corresponds to a linear antenna array of dimension $N_2$, and $R_{2 \times 2}^{CLA}$ is a third covariance matrix that corresponds to an antenna correlation between two antenna polarizations;
quantize the first covariance matrix, the second covariance matrix and the third covariance matrix; and
report a quantized first covariance matrix, a quantized second covariance matrix and a quantized third covariance matrix to the base station to enable the base station to reconstruct the covariance matrix (R) for beamforming.

10. An apparatus of a base station operable to perform beamforming, the apparatus comprising:
one or more processors configured to:
decode, at the base station, a quantized version of an M× M covariance matrix received as feedback from a user equipment (UE), wherein M corresponds to M best diagonal entries of matrix A in accordance with $A = U^H \text{Cov} U$, wherein Cov is a covariance matrix for a channel between the UE and the base station, U is an orthonormal basis matrix (U), and $U^H$ is a Hermitian of the orthonormal base matrix (U), and wherein the matrix A has a dimension reduced from Nt× Nt to $$\frac{Nt}{2} \times \frac{Nt}{2}$$

when cross-polarized antennas are used at the base station, wherein Nt represents a number of transmit antennas;
generate, at the base station, a reconstructed covariance matrix using the quantized version of an M× M covariance matrix received as feedback from the UE; and
perform, at the base station, beamforming based on the reconstructed covariance matrix; and
a memory interface configured to send to a memory the quantized version of an M× M covariance matrix.

11. The apparatus of claim 10, wherein the one or more processors are configured to:
decode the feedback received from the UE, wherein the feedback includes indices associated with the M best diagonal entries of matrix A; and
generate the reconstructed covariance matrix based on the feedback to determine a precoder or beamformer to be used for beamforming.

12. At least one non-transitory machine readable storage medium having instructions embodied thereon for assisting a base station for beamforming, the instructions when executed by one or more processors of a user equipment (UE) perform the following:
determining, at the UE, a covariance matrix (Cov) for a channel between the UE and the base station, wherein Cov=UAU$^H$ where A is a matrix that represents a projection of vectors of the covariance matrix (Cov) to an orthonormal basis in matrix (U), and $U^H$ is a Hermitian the orthonormal base matrix (U);

reducing a dimension of the matrix A from Nt× Nt to $$\frac{Nt}{2} \times \frac{Nt}{2}$$

when cross-polarized antennas are used at the base station, wherein Nt represents a number of transmit antennas;

quantizing, at the UE, the covariance matrix to obtain a quantized covariance matrix, wherein the quantized covariance matrix includes M best diagonal entries that are selected from the covariance matrix, wherein M is an integer; and encoding, at the UE, the quantized covariance matrix as feedback for transmission to the base station.

13. The at least one non-transitory machine readable storage medium of claim 12, further comprising instructions when executed perform the following:

dividing the matrix A into four sub-matrices; and calculating an average matrix from two of the four sub-matrices corresponding to different antenna polarizations.

14. The at least one non-transitory machine readable storage medium of claim 12, further comprising instructions when executed perform the following:

determining that a final precoding matrix (W) to be applied at the base station is in accordance with: W=QW2, wherein matrix Q is derived from the matrix A and is an Nt× M matrix, wherein matrix W2 is fed back from the UE to the base station, and each element of matrix W2 is quantized.

15. The at least one non-transitory machine readable storage medium of claim 12, further comprising instructions when executed perform the following: supporting covariance matrix compression using Type I feedback to reduce a signaling overhead between the UE and the base station, wherein the covariance matrix compression involves encoding the quantized covariance matrix as feedback for transmission to the base station.

16. The at least one non-transitory machine readable storage medium of claim 12, further comprising instructions when executed perform the following:

decoding one of a precoded channel state information reference signal (CSI-RS) or a non-precoded CSI-RS that is received from the base station; and determining the covariance matrix based on the pre-coded CSI-RS or the nonprecoded CSI-RS.

17. The at least one non-transitory machine readable storage medium of claim 12, further comprising instructions when executed perform the following:

determining the covariance matrix (Cov) in accordance with the following:

$$\begin{bmatrix} 1 & \rho & \cdots & \rho^{N-1} \\ \rho^* & \beta_1 & & \rho^{N-2} \\ \vdots & \vdots & \ddots & \\ (\rho^*)^{N-1} & (\rho^*)^{N-2} & \cdots & \beta_{N-1} \end{bmatrix},$$

wherein $\rho$ represents a correlation between antenna ports and $\beta$ represents a transmit power from an $i^{th}$ antenna relative to a transmit power of a first antenna; and encoding the M best diagonal entries of matrix A and $\rho$ as feedback for transmission to the base station.

18. The at least one non-transitory machine readable storage medium of claim 12, further comprising instructions when executed perform the following:

determining the covariance matrix (R) in accordance with the following:

$$R = R_{2\times 2}^{CLA} \otimes R_{N_2\times N_2}^{ULA} \otimes R_{N_1\times N_1}^{ULA},$$

wherein $R_{N_1\times N_1}^{ULA}$ is a first covariance matrix that corresponds to a linear antenna array of dimension $N_1$, $R_{N_2\times N_2}^{ULA}$ is a second covariance matrix that corresponds to a linear antenna array of dimension $N_2$, and $R_{2\times 2}^{CLA}$ is a third covariance matrix that corresponds to a linear antenna correlation between two antenna polarizations;

quantizing the first covariance matrix, the second covariance matrix and the third covariance matrix; and reporting a quantized first covariance matrix, a quantized second covariance matrix and a quantized third covariance matrix to the base station to enable the base station to reconstruct the covariance matrix (R) for beamforming.

* * * * *

UNITED STATES PATENT AND TRADEMARK OFFICE
CERTIFICATE OF CORRECTION

PATENT NO. : 11,025,310 B2  
APPLICATION NO. : 16/476537  
DATED : June 1, 2021  
INVENTOR(S) : Davydov et al.

Page 1 of 1

It is certified that error appears in the above-identified patent and that said Letters Patent is hereby corrected as shown below:

In the Claims

Claim 1, Line 10, change "Hermitian the orthonormal" to -- Hermitian of the orthonormal --.

Claim 12, Line 11, change "Hermitian the orthonormal" to -- Hermitian of the orthonormal --.

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*